US012555734B2

(12) United States Patent
Zhang

(10) Patent No.: US 12,555,734 B2
(45) Date of Patent: Feb. 17, 2026

(54) MULTI-BEAM X-RAY SOURCE AND METHOD FOR FORMING SAME

(71) Applicant: NCX Corporation, Raleigh, NC (US)

(72) Inventor: Jian Zhang, Durham, NC (US)

(73) Assignee: NCX Corporation, Raleigh, NC (US)

( * ) Notice: Subject to any disclaimer, the term of this patent is extended or adjusted under 35 U.S.C. 154(b) by 244 days.

(21) Appl. No.: 18/247,265

(22) PCT Filed: Sep. 29, 2021

(86) PCT No.: PCT/IB2021/058947
§ 371 (c)(1),
(2) Date: Mar. 29, 2023

(87) PCT Pub. No.: WO2022/070102
PCT Pub. Date: Apr. 7, 2022

(65) Prior Publication Data

US 2023/0411106 A1 Dec. 21, 2023

Related U.S. Application Data

(60) Provisional application No. 63/085,434, filed on Sep. 30, 2020.

(51) Int. Cl.
*H01J 35/14* (2006.01)

(52) U.S. Cl.
CPC ....... *H01J 35/153* (2019.05); *H01J 2235/068* (2013.01)

(58) Field of Classification Search
CPC .......................... H01J 35/153; H01J 2235/068
See application file for complete search history.

(56) References Cited

U.S. PATENT DOCUMENTS 8,619,946 B2 * 12/2013 Hanke .................. H01J 35/153 378/124
2009/0190719 A1 * 7/2009 Barschdorf ........... H01J 35/153 378/137
2016/0056008 A1 * 2/2016 Mackie .................. H01J 35/13 378/5
2020/0170097 A1 * 5/2020 Tan ........................ H01J 35/30

FOREIGN PATENT DOCUMENTS

JP 2018-037144 3/2018
TW 202006777 A 2/2020

OTHER PUBLICATIONS

Behling, Rolf, et al., "Chapter 6: Diagnostic X-Ray Sources from the Inside," Modern Diagnostic X-Ray Sources, Taylor & Francis Group, pp. 177-308, Jan. 1, 2016. Retrieved from the Internet: https://ebookcentral.proquest.com/lib/epo-ebooks/detail.action?docID=2075866 [retrieved on Jun. 26, 2015].

* cited by examiner

*Primary Examiner* — Chih-Cheng Kao
(74) *Attorney, Agent, or Firm* — Womble Bond Dickinson (US) LLP

(57) ABSTRACT

An X-ray source device includes an anode and an electron beam cathode system arranged to emit a plurality of electron beams therefrom toward the anode. A deflector device is disposed adjacent to the electron beam cathode system to manipulate interaction of one or more of the electron beams emitted by the electron beam cathode system with the anode. An associated method of forming an X-ray source device is also provided.

16 Claims, 5 Drawing Sheets

MULTI-BEAM X-RAY SOURCE AND METHOD FOR FORMING SAME

CROSS-REFERENCE TO RELATED APPLICATIONS

This application is a national stage filing under 35 U.S.C. 371 of PCT/IB2021/058947, filed Sep. 29, 2021, which International Application was published by the International Bureau in English on Apr. 7, 2022, as WO 2022/070102, and application claims priority from U.S. Application No. 63/085,434, filed on Sep. 30, 2020, which applications are hereby incorporated in their entirety by reference in this application.

BACKGROUND

Field of the Disclosure

The present application relates to x-ray devices and, more particularly, to a multi-beam X-ray source and a method of forming a multi-beam X-ray source.

Description of Related Art

A typical X-ray tube includes a cathode and an anode (see, e.g., FIG. 1), wherein the cathode (e.g., a hot filament, a field emission emitter, etc.) emits electrons. The anode carries a high voltage (e.g., 10 kV or above). Under these conditions, the electrons emitted by the cathode are accelerated by the electric field generated by the anode, and are attracted to and directed toward to the anode (e.g., as an electron beam). Upon the electrons impacting the anode (e.g., at a focal spot or focal point on the anode), X-ray radiation is generated via the impact/interaction between the electron beam and the anode. Generally, an X-ray tube has a single cathode emitting a single electron beam and a single anode. Therefore, the anode typically defines only a single focal spot or focal point of the electron beam, which usually corresponds to a fixed area on the anode (e.g., the area of the anode impacted by the electron beam).

Figure 2A:
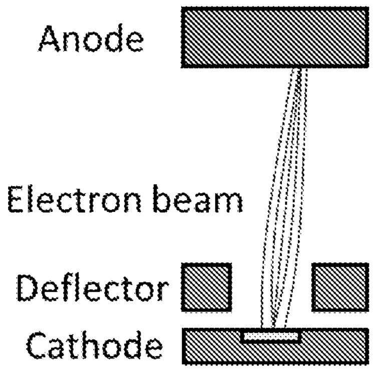
FIG. 2A Prior Art
Figure 2B:
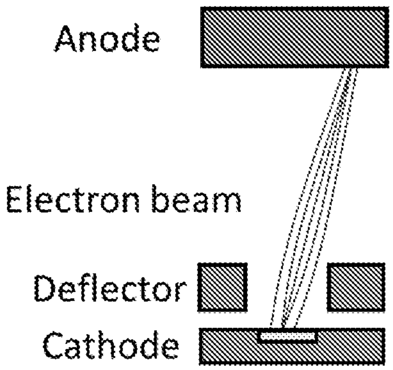
FIG. 2B Prior Art
Figure 2C:
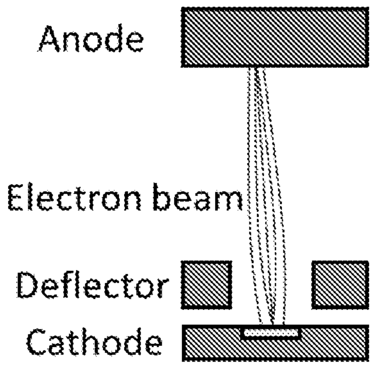
FIG. 2C Prior Art
Figure 2D:
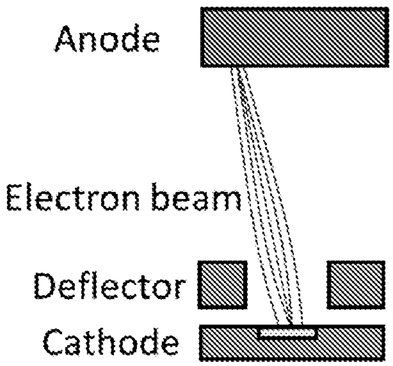
FIG. 2D Prior Art

In some prior art instances, the X-ray tube can include a deflector device along the path of electron beam between the cathode and the anode. The deflector generates an electric field and/or a magnetic field to laterally deflect the electron beam, and thus produce focal spots or focal points at different locations on the anode, as compared to the focal spot/point of the electron beam in the absence of the deflector device and the electric field and/or magnetic field (see, e.g., FIG. 2A). In such instances, the strength, duration, and/or polarity of the deflecting electric field and/or magnetic field can be varied to control the magnitude and/or direction of the deflection of the electron beam (see, e.g., FIGS. 2A-2D).

Such an arrangement for deflecting the electron beam, however, has some limitations. For example, such an electron beam deflection arrangement is generally capable deflecting the electron beam at a relatively small deflection angle (e.g., <10 degrees), without distorting the electron beam cross-section, and thus adversely affecting the focus of the electron beam at the new/intended focal spot/point on the anode. Complex provisions and equipment are generally required for deflecting the electron beam at a relatively large deflection angle (e.g., >10 degrees), while preserving focus of the electron beam at the new/intended focal spot/point on the anode. As such, this electron beam deflection arrangement has limited application for traditional single anode/single cathode X-ray tubes generating one X-ray beam directed to only one focal spot/point on the anode.

Figure 3:
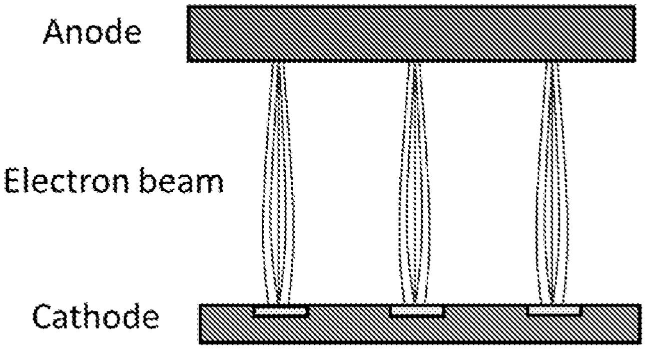
FIG. 3 Prior Art

A multi-beam X-ray source generally includes multiple X-ray tubes integrated together to form a pre-defined configuration such as a linear multi-beam X-ray source as shown, for example, in FIG. 3, generally include an array of cathodes each arranged to direct a single electron beam toward a corresponding focal spot/point on the anode. Such a multi-beam X-ray source has the capability of simultaneously generating multiple X-ray beams, without any mechanical movement of the X-ray tubes or the components thereof. In addition, such a multi-beam X-ray source has potential to be used for various applications including tomosynthesis and computed tomography. In certain applications such as computed tomography, a multi-beam X-ray source with multiple (e.g., hundreds) individual X-ray focal spots/points on the anode may be required. In order to integrate multiple X-ray focal spots/points in a limited space on the anode, a high packing density of focal spots/points is needed. However, in each X-ray tube, the emitting area of each cathode is often much larger than the area of the focal spot/point on the anode. Accordingly, such prior art multi-beam X-ray sources are generally unable to achieve a relatively high X-ray beam packing density (e.g., any cumulative benefit in the X-rays generated by the multiple electron beams is attenuated due to the minimum achievable spacing between the focal spots/points on the anode) due to limitations in physical dimensions of various components including the cathodes, the focusing (gate) electrodes, etc.

In addition, for a multi-beam X-ray source, particularly one with hundreds of focal spots/points, it is difficult to produce a cathode array wherein all of the X-ray tubes (e.g., each of the cathodes emitting an electron beam interacting with the anode at a focal spot/point) are operable and without any defects. That is, it is normal for a multi-beam X-ray source to have a few defects causing malfunctioning, and thus inoperability, of some of the cathodes and corresponding focal spots/points (see, e.g., FIG. 4). Typically, if there is only a small number of malfunctioning/inoperable cathodes and corresponding focal spots/points, it may be possible to compensate for the loss of the X-rays generated at those focal spots/points by way of imaging software correction, though such a solution is generally not preferred. In other instances, however, the defects may be sufficiently numerous to render the entire multi-beam X-ray source useless, thereby significantly lowering production yield and raising costs.

Thus, there exists a need for a multi-beam X-ray source, and a method of forming such a multi-beam X-ray source, wherein a high X-ray beam packing density can be achieved. In addition, such a multi-beam X-ray source should desirably include the capability of compensating for malfunctioning/inoperable cathodes/electron beams so as to provide acceptable operability of the device, thereby increasing production yield of the X-ray source and decreasing production and/or operational costs.

SUMMARY OF THE DISCLOSURE

The above and other needs are met by aspects of the present disclosure which includes, without limitation, the following example embodiments and, in one particular aspect, provides an X-ray source device, comprising an anode and an electron beam cathode system arranged to emit a plurality of electron beams therefrom toward the anode. A deflector device is disposed adjacent to the electron beam cathode system to manipulate interaction of one or more of the electron beams emitted by the electron beam cathode system with the anode.

Another example aspect provides a method of forming an X-ray source device, comprising arranging an electron beam cathode system to emit a plurality of electron beams therefrom toward an anode, and disposing a deflector device adjacent to the electron beam cathode system, wherein the deflector device is arranged to manipulate interaction of one or more of the electron beams emitted by the electron beam cathode system with the anode.

The present disclosure thus includes, without limitation, the following example embodiments:

Example Embodiment 1: An X-ray source device, comprising an anode; an electron beam cathode system arranged to emit a plurality of electron beams therefrom toward the anode; and a deflector device disposed adjacent to the electron beam cathode system to manipulate interaction of one or more of the electron beams emitted by the electron beam cathode system with the anode.

Example Embodiment 2: The device of any preceding example embodiment, or combinations thereof, wherein the deflector device is arranged to form an electric field or a magnetic field to manipulate the one or more of the electron beams emitted by the electron beam cathode system.

Example Embodiment 3: The device of any preceding example embodiment, or combinations thereof, wherein the deflector device is arranged to physically manipulate the one or more of the electron beams emitted by the electron beam cathode system.

Example Embodiment 4: The device of any preceding example embodiment, or combinations thereof, wherein the deflector device is arranged to form an electric field or a magnetic field, and to physically manipulate the electric field or magnetic field, to manipulate the one or more of the electron beams emitted by the electron beam cathode system.

Example Embodiment 5: The device of any preceding example embodiment, or combinations thereof, wherein the electron beam cathode system comprises a plurality of adjacently-arranged cathode devices, each cathode device being arranged to emit one of the electron beams toward a corresponding one of a plurality of adjacently-arranged predetermined focal points on the anode.

Example Embodiment 6: The device of any preceding example embodiment, or combinations thereof, wherein the deflector device defines a plurality of deflector portions corresponding to the plurality of cathode devices, each deflector portion being arranged to manipulate the electron beam emitted by a corresponding one of the cathode devices.

Example Embodiment 7: The device of any preceding example embodiment, or combinations thereof, wherein the deflector device defines a plurality of deflector portions each corresponding to more than one of the plurality of cathode devices, each deflector portion being arranged to manipulate the electron beams collectively emitted by the corresponding more than one of the cathode devices.

Example Embodiment 8: The device of any preceding example embodiment, or combinations thereof, wherein the deflector device is arranged to re-direct the electron beam emitted by one of the cathode devices to one of the predetermined focal points on the anode adjacent to the corresponding predetermined focal point for the one of the cathode devices.

Example Embodiment 9: The device of any preceding example embodiment, or combinations thereof, wherein the deflector device is arranged to re-direct the electron beams emitted by each of the cathode devices to one of the predetermined focal points on the anode adjacent to the corresponding predetermined focal point for the each of the cathode devices.

Example Embodiment 10: The device of any preceding example embodiment, or combinations thereof, wherein the deflector device is arranged to re-direct the electron beam emitted by one of the cathode devices to a new focal point on the anode, the new focal point being disposed between the corresponding predetermined focal point for the one of the cathode devices and one of the predetermined focal points adjacent thereto.

Example Embodiment 11: A method of forming an X-ray source device, comprising arranging an electron beam cathode system to emit a plurality of electron beams therefrom toward an anode; and disposing a deflector device adjacent to the electron beam cathode system, the deflector device being arranged to manipulate interaction of one or more of the electron beams emitted by the electron beam cathode system with the anode.

Example Embodiment 12: The method of any preceding example embodiment, or combinations thereof, comprising arranging the deflector device to form an electric field or a magnetic field to manipulate the one or more of the electron beams emitted by the electron beam cathode system.

Example Embodiment 13: The method of any preceding example embodiment, or combinations thereof, comprising arranging the deflector device to physically manipulate the one or more of the electron beams emitted by the electron beam cathode system.

Example Embodiment 14: The method of any preceding example embodiment, or combinations thereof, comprising arranging the deflector device to form an electric field or a magnetic field, and to physically manipulate the electric field or magnetic field, to\ manipulate the one or more of the electron beams emitted by the electron beam cathode system.

Example Embodiment 15: The method of any preceding example embodiment, or combinations thereof, wherein the electron beam cathode system comprises a plurality of adjacently-arranged cathode devices, and wherein the method comprises arranging each cathode device to emit one of the electron beams toward a corresponding one of a plurality of adjacently-arranged predetermined focal points on the anode.

Example Embodiment 16: The method of any preceding example embodiment, or combinations thereof, wherein the deflector device defines a plurality of deflector portions corresponding to the plurality of cathode devices, and wherein the method comprises arranging each deflector portion to manipulate the electron beam emitted by a corresponding one of the cathode devices.

Example Embodiment 17: The method of any preceding example embodiment, or combinations thereof, wherein the deflector device defines a plurality of deflector portions each corresponding to more than one of the plurality of cathode devices, and wherein the method comprises arranging each deflector portion to manipulate the electron beams collectively emitted by the corresponding more than one of the cathode devices.

Example Embodiment 18: The method of any preceding example embodiment, or combinations thereof, comprising arranging the deflector device to re-direct the electron beam emitted by one of the cathode devices to one of the predetermined focal points on the anode adjacent to the corresponding predetermined focal point for the one of the cathode devices.

Example Embodiment 19: The method of any preceding example embodiment, or combinations thereof, comprising arranging the deflector device to re-direct the electron beams emitted by each of the cathode devices to one of the predetermined focal points on the anode adjacent to the corresponding predetermined focal point for the each of the cathode devices.

Example Embodiment 20: The method of any preceding example embodiment, or combinations thereof, comprising arranging the deflector device to re-direct the electron beam emitted by one of the cathode devices to a new focal point on the anode, the new focal point being disposed between the corresponding predetermined focal point for the one of the cathode devices and one of the predetermined focal points adjacent thereto.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 1:
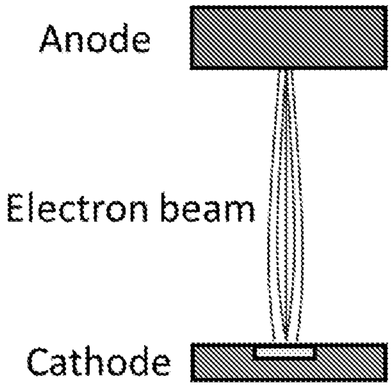
FIG. 1 Prior Art
Figure 4:
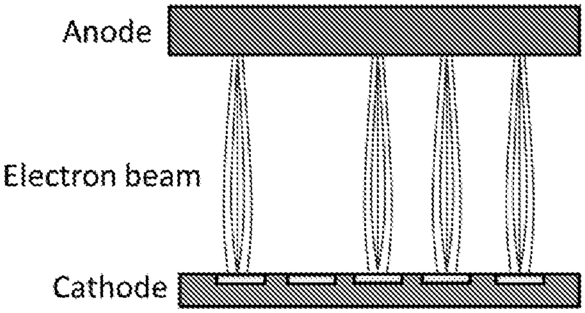
FIG. 4 Prior Art
Figure 5:
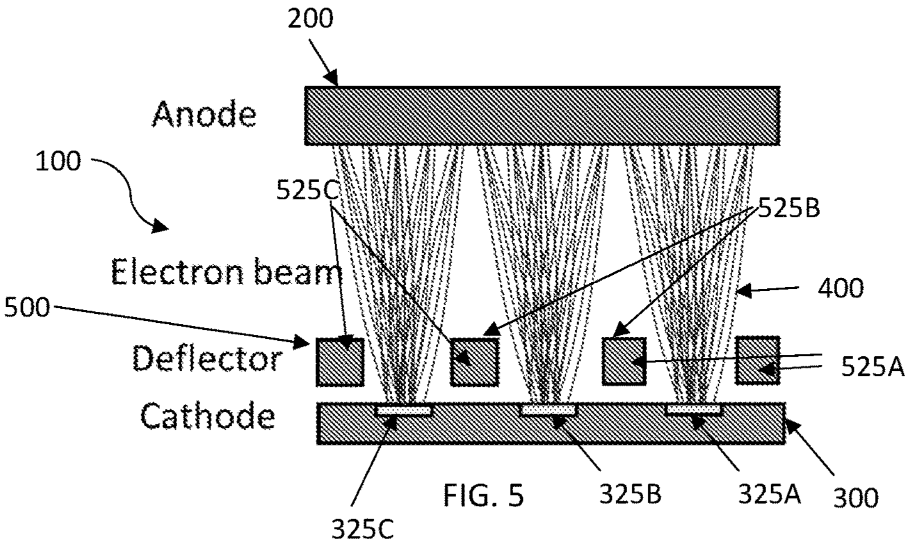
Figure 6A:
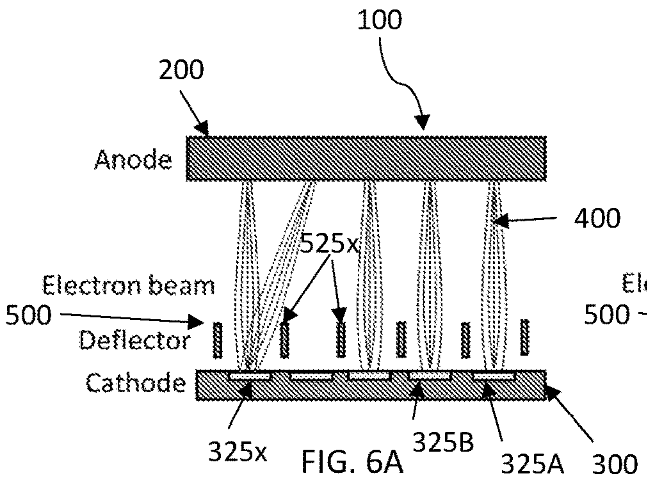
Figure 6B:
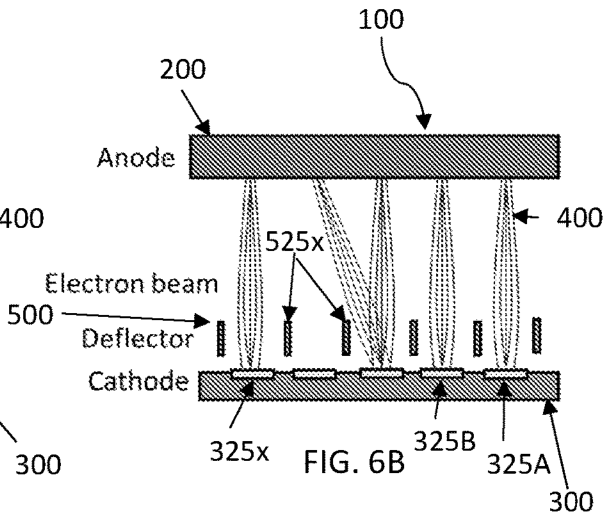
Figures 7A, 7B:
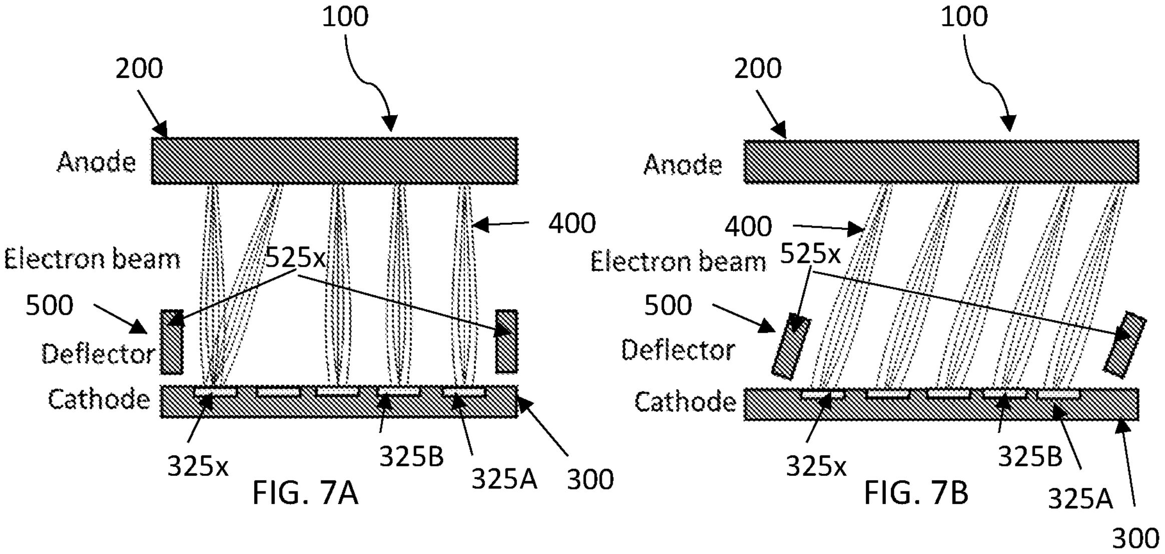

Having thus described the disclosure in general terms, reference will now be made to the accompanying drawings, which are not necessarily drawn to scale, and wherein:

FIG. 1 schematically illustrates a prior art example of an X-ray tube structure including a single anode and a single cathode;

FIGS. 2A-2D schematically illustrates a prior art example of an X-ray tube structure including a single anode and a single cathode, with an electron beam deflector device capable of deflecting the electron beam emitted from the cathode by generating and applying an electric field and/or a magnetic field to manipulate the electron beam;

FIG. 3 schematically illustrates a prior art example of a multi-beam X-ray source with multiple cathodes formed in a linear array;

FIG. 4 schematically illustrates a prior art example of a multi-beam X-ray source with multiple cathodes formed in a linear array, demonstrating the electron beam generating effect of the array in instances of a malfunctioning cathode in the array, resulting in the loss of a corresponding focal spot/point on the anode;

FIG. 5 schematically illustrates a multi-beam X-ray source implementing an electron beam deflection device, according to one aspect of the present disclosure;

FIGS. 6A and 6B schematically illustrate one aspect of the present disclosure wherein an electron beam of one cathode device is directed by the deflector device to a focal spot/point of an adjacent cathode device to compensate for a malfunctioning/inoperable cathode device;

FIG. 7A schematically illustrates a multi-beam X-ray source according to another aspect of the present disclosure, implementing a deflector device applicable to the electron beams collectively from the plurality of cathode devices; and FIG. 7B schematically illustrates a multi-beam X-ray source according to another aspect of the present disclosure, implementing a physically adjustable deflector device applicable to the electron beams collectively from the plurality of cathode devices.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 5 schematically illustrates a multi-beam X-ray source according to one aspect of the present disclosure. Such a multi-beam X-ray source includes an anode and an electron beam cathode system arranged to emit a plurality of electron beams therefrom toward the anode. A deflector device (e.g., an electron beam-deflecting electrode) is disposed adjacent to the electron beam cathode system to manipulate interaction of one or more of the electron beams emitted by the electron beam cathode system with the anode. In particular aspects, the deflector device is arranged to form an electric field and/or a magnetic field to manipulate the one or more of the electron beams emitted by the electron beam cathode system.

That is, in some aspects, the electron beam cathode system comprises a plurality of adjacently-arranged cathode devices, with each cathode device being arranged to emit one of the electron beams toward a corresponding one of a plurality of adjacently-arranged predetermined focal points on the anode. Each cathode device can comprise, for example, a hot filament emitter, a field emission emitter, or any other suitable electron emitter.

In some aspects, the deflector device defines a plurality of deflector portions corresponding to the plurality of cathode devices, wherein each deflector portion is arranged to manipulate the electron beam emitted by a corresponding one of the cathode devices. That is, the deflector device is configured such that a particular portion thereof corresponds to a single cathode device, and that portion is arranged to control/manipulate the electron beam only from that cathode device. For example, each portion of the deflector device can define an opening for allowing the electron beam from the corresponding cathode device to pass therethrough and, as such, the deflector device may be a series of such portions each defining an opening, or may be an integral element in the form of a mesh-like structure or a grill-like structure.

In other aspects, the deflector device defines a plurality of deflector portions each corresponding to more than one of the plurality of cathode devices, wherein each deflector portion is arranged to manipulate the electron beams collectively emitted by the corresponding more than one of the cathode devices. That is, the deflector device is configured such that a particular portion thereof corresponds to more than one cathode device (e.g., a group of two, three, four, or more adjacent cathode devices), and that portion is arranged to control/manipulate the collective electron beams from those more-than-one cathode devices. For example, each portion of the deflector device can define an opening for allowing the electron beams from the corresponding two or more cathode devices to pass therethrough and, as such, the deflector device may be a series of such portions each defining an opening, or may be an integral element in the form of a mesh-like structure or a grill-like structure.

In particular aspects, the deflector device, when energized to form the electric field and/or magnetic field, is arranged to re-direct each of the electron beams emitted by one or more of the cathode devices to one of the predetermined focal points on the anode adjacent to the corresponding predetermined focal point for each of the one or more cathode devices. That is, the implementation of a deflecting electrode (deflector device) for steering, controlling, or otherwise manipulating the electron beams emitted from the cathodes allows for each cathode to be capable of emitting the electron beam toward multiple X-ray focal spots/points on the anode. In doing do, the electron beam from one cathode device can be manipulated by the deflector device toward a predetermined focal spot/point on the anode corresponding to the electron beam emitted by an adjacent cathode device. In some particular aspects, the electron beam from one cathode device is manipulated by the deflector device to a predetermined focal spot/point on the anode corresponding to the electron beam emitted by an adjacent cathode device (see, e.g., FIGS. 6A and 6B). In this manner, the multi-beam X-ray source implementing a deflector device according to aspects of the disclosure can compensate for a malfunctioning or inoperable cathode device in the array (e.g., as shown in FIG. 4) with the electrode beam from an adjacent cathode device. This capability of compensating for malfunctioning/inoperable cathode devices will increase the production yield of such X-ray sources (e.g., at least the electrode emission cathode system thereof), possibly extend the X-ray source operational lifetime, and lower the cost of production and/or operation.

In other particular aspects, the deflector device is arranged and configured to be capable of re-directing the electron beams emitted by each of the cathode devices to or toward one of the predetermined focal points on the anode adjacent to the corresponding predetermined focal point for the each of the cathode devices (e.g., the deflector device is capable of deflecting the electron beam from each cathode device in the array). In still further aspects, the deflector device is arranged to re-direct the electron beam emitted by one of the cathode devices to a new focal point on the anode, the new focal point being disposed between the corresponding predetermined focal point for the one of the cathode devices and one of the predetermined focal points adjacent thereto (see, e.g., FIG. 5). In doing so, by application of the deflecting field produced by the deflector device, each cathode device in the array can thus be directed toward multiple focal spots/points on the anode. As such, the cathode devices and/or the deflector device can be arranged to re-direct the electron beams from the plurality of cathode devices, each at a relatively small angle, to increase the packing density of X-ray focal spots/points (e.g., the proximity of the focal spots/points with respect to each other) on the anode.

The configuration of the deflector device can vary. For example, as shown in FIG. 7A, instead of having an individual portion of the deflector device corresponding to each cathode device, the deflector device is configured/arranged to be applied to the electron beams collectively emitted by all of the cathode devices (e.g., a single deflecting electrode/deflector device applied to all electron beams emitted by the cathode devices). In such aspects, the operating parameters of the deflector device (e.g., electric/magnetic field strength, duration, etc.) may require adjustment for each focal spot/point on the anode.

In other aspects, the deflector device is arranged to physically manipulate the one or more of the electron beams emitted by the electron beam cathode system. That is, the deflector device may be physically adjustable to accomplish the particular deflection of the electron beam(s) as shown, for example, in FIG. 7B. In yet other aspects, the deflector device is arranged to form an electric field or a magnetic field, and to physically manipulate the electric field or magnetic field, to manipulate the one or more of the electron beams emitted by the electron beam cathode system (e.g., a combination of the physical adjustability of the deflector device, and the electric field and/or magnetic field applied via the deflector device).

Aspects of the present disclosure thus provide a multi-beam X-ray source, and a method of forming such a multi-beam X-ray source, wherein a high X-ray beam packing density can be achieved. In addition, such a multi-beam X-ray source provides the capability of compensating for malfunctioning/inoperable cathodes/electron beams so as to provide acceptable operability of the device, thereby increasing production yield of the X-ray source and decreasing production and/or operational costs.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term “and/or” and the “I” symbol includes any and all combinations of one or more of the associated listed items.

As used herein, the singular forms “a”, “an” and “the” are intended to include the plural forms as well, unless the context clearly indicates otherwise. It will be further understood that the terms “comprises”, “comprising”, “includes”, and/or “including”, when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. An X-ray source device, comprising:

an anode;

an electron beam cathode system including a plurality of adjacently-arranged cathode devices, each cathode device being arranged to emit one of a plurality of electron beams therefrom toward a corresponding one of a plurality of adjacently-arranged predetermined focal points on the anode; and a deflector device disposed adjacent to the electron beam cathode system to manipulate interaction of one or more of the electron beams emitted by the electron beam cathode system with the anode, the deflector device being arranged to re-direct the electron beam emitted by a first cathode device of the cathode system to a second predetermined focal point on the anode, the second predetermined focal point corresponding to a second cathode device of the cathode system and the second predetermined focal point being adjacent to a first predetermined focal point on the anode corresponding to the first cathode device.

2. The device of claim 1, wherein the deflector device is arranged to form an electric field or a magnetic field to manipulate the one or more of the electron beams emitted by the electron beam cathode system.

3. The device of claim 1, wherein the deflector device is arranged to physically manipulate the one or more of the electron beams emitted by the electron beam cathode system.

4. The device of claim 1, wherein the deflector device is arranged to form an electric field or a magnetic field, and to physically manipulate the electric field or magnetic field, to manipulate the one or more of the electron beams emitted by the electron beam cathode system.

5. An X-ray source device, comprising:

an anode;

an electron beam cathode system including a plurality of adjacently-arranged cathode devices, each cathode device being arranged to emit one of a plurality of electron beams therefrom toward a corresponding one of a plurality of adjacently-arranged predetermined focal points on the anode; and a deflector device disposed adjacent to the electron beam cathode system to manipulate interaction of one or more of the electron beams emitted by the electron beam cathode system with the anode, the deflector device defining a plurality of deflector portions each corresponding to more than one of the plurality of cathode devices, each deflector portion being arranged to manipulate the electron beams collectively emitted by the corresponding more than one of the cathode devices.

6. The device of claim 5, wherein the deflector device is arranged to form an electric field or a magnetic field to manipulate the one or more of the electron beams emitted by the electron beam cathode system.

7. The device of claim 5, wherein the deflector device is arranged to physically manipulate the one or more of the electron beams emitted by the electron beam cathode system.

8. The device of claim 5, wherein the deflector device is arranged to form an electric field or a magnetic field, and to physically manipulate the electric field or magnetic field, to manipulate the one or more of the electron beams emitted by the electron beam cathode system.

9. A method of forming an X-ray source device, comprising:

arranging an electron beam cathode system including a plurality of adjacently-arranged cathode devices to emit a plurality of electron beams therefrom toward an anode, such that each cathode device is arranged to emit one of the plurality of electron beams therefrom toward a corresponding one of a plurality of adjacently-arranged predetermined focal points on the anode; and disposing a deflector device adjacent to the electron beam cathode system, the deflector device being arranged to manipulate interaction of one or more of the electron beams emitted by the electron beam cathode system with the anode, such that the deflector device is arranged to re-direct the electron beam emitted by a first cathode device of the cathode system to a second predetermined focal point on the anode, the second predetermined focal point corresponding to a second cathode device of the cathode system and the second predetermined focal point being adjacent to a first predetermined focal point on the anode corresponding to the first cathode device.

10. The method of claim 9, comprising arranging the deflector device to form an electric field or a magnetic field to manipulate the one or more of the electron beams emitted by the electron beam cathode system.

11. The method of claim 9, comprising arranging the deflector device to physically manipulate the one or more of the electron beams emitted by the electron beam cathode system.

12. The method of claim 9, comprising arranging the deflector device to form an electric field or a magnetic field, and to physically manipulate the electric field or magnetic field, to manipulate the one or more of the electron beams emitted by the electron beam cathode system.

13. A method of forming an X-ray source device, comprising:

arranging an electron beam cathode system including a plurality of adjacently-arranged cathode devices to emit a plurality of electron beams therefrom toward an anode, such that each cathode device is arranged to emit one of the plurality of electron beams therefrom toward a corresponding one of a plurality of adjacently-arranged predetermined focal points on the anode; and disposing a deflector device adjacent to the electron beam cathode system, the deflector device being arranged to manipulate interaction of one or more of the electron beams emitted by the electron beam cathode system with the anode, the deflector device defining a plurality of deflector portions each corresponding to more than one of the plurality of cathode devices, such that each deflector portion is arranged to manipulate the electron beams collectively emitted by the corresponding more than one of the cathode devices.

14. The method of claim 13, comprising arranging the deflector device to form an electric field or a magnetic field to manipulate the one or more of the electron beams emitted by the electron beam cathode system.

15. The method of claim 13, comprising arranging the deflector device to physically manipulate the one or more of the electron beams emitted by the electron beam cathode system.

16. The method of claim 13, comprising arranging the deflector device to form an electric field or a magnetic field, and to physically manipulate the electric field or magnetic field, to manipulate the one or more of the electron beams emitted by the electron beam cathode system.

* * * * *